(12) United States Patent
Chen et al.

(10) Patent No.: US 9,745,018 B2
(45) Date of Patent: Aug. 29, 2017

(54) WHEEL HUB MOTOR AND MOTOR HOUSING OF WHEEL HUB MOTOR

(71) Applicant: HON HAI PRECISION INDUSTRY CO., LTD., New Taipei (TW)

(72) Inventors: Yen-Chi Chen, New Taipei (TW); Chang-Yuan Shih, New Taipei (TW); Shih-Hsin Hsu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 69 days.

(21) Appl. No.: 14/790,315

(22) Filed: Jul. 2, 2015

(65) Prior Publication Data

US 2016/0339994 A1 Nov. 24, 2016

(30) Foreign Application Priority Data

May 18, 2015 (TW) .............................. 104115810 A

(51) Int. Cl.
*B62M 6/60* (2010.01)
*B60B 27/00* (2006.01)
*B60K 7/00* (2006.01)
*H02K 5/04* (2006.01)
*H02K 7/14* (2006.01)

(52) U.S. Cl.
CPC ........... *B62M 6/60* (2013.01); *B60B 27/0015* (2013.01); *B60K 7/0007* (2013.01); *H02K 5/04* (2013.01); *H02K 7/14* (2013.01); *B60K 2007/0092* (2013.01)

(58) Field of Classification Search
CPC .... B60B 27/0015; B60K 7/0007; H02K 5/04; H02K 7/14; B62M 6/60
See application file for complete search history.

(56) References Cited

U.S. PATENT DOCUMENTS 7,137,315 B2 * 11/2006 Chang ............... B60K 7/0015
180/308

FOREIGN PATENT DOCUMENTS

TW M440930 U 11/2012

* cited by examiner

*Primary Examiner* — John Walters
*Assistant Examiner* — James Triggs
(74) *Attorney, Agent, or Firm* — Steven Reiss

(57) ABSTRACT

A wheel hub motor includes a motor housing and a motor received in the motor housing. The motor housing includes a first holder, a second holder coupled to the first holder, and a protective ring detachably coupled to the second holder. The motor is received in the first holder and the second holder. An inner diameter of the second holder is equal to an outer diameter of the motor. An outer diameter of the protective ring is greater than the outer diameter of the motor. An inner diameter of the protective ring is smaller than the outer diameter of the motor.

12 Claims, 8 Drawing Sheets

WHEEL HUB MOTOR AND MOTOR HOUSING OF WHEEL HUB MOTOR

FIELD

The subject matter herein generally relates to wheel hub motors, and particularly to a wheel hub motor for a vehicle using electric power and a motor housing for holding a motor.

BACKGROUND

Vehicles using electric power, such as electric bicycles, are very popular, especially for young people. A wheel hub motor is provided in an electric bicycle for driving the electric bicycle.

BRIEF DESCRIPTION OF THE DRAWINGS

Implementations of the present technology will now be described, by way of example only, with reference to the attached figures.

DETAILED DESCRIPTION

Figure 1:
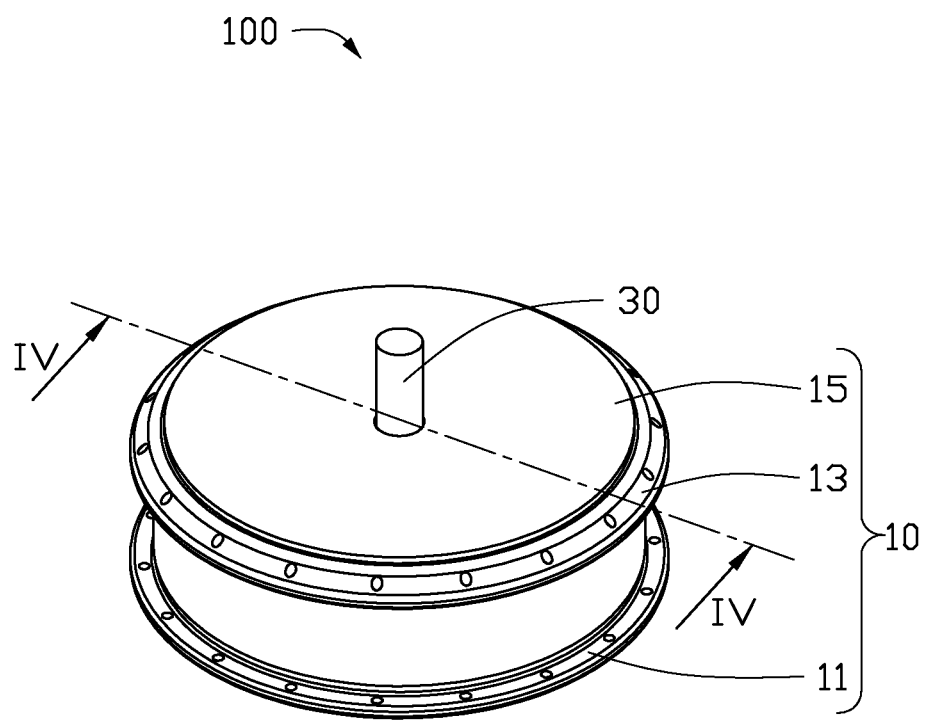
FIG. 1 is an isometric view of a first embodiment of a wheel hub motor.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is in relation to a wheel hub motor can include a motor housing and a motor. The motor housing can include a first holder, a second holder detachably coupled to the first holder, and a protective ring detachably coupled to the second holder. The second holder can be positioned between the first holder and the protective ring. The motor can include a motor body and a rotatable shaft protruding from the motor body and extending out from the protective ring. The motor body can be received between the first holder and the second holder.

The present disclosure is in relation to a wheel hub motor can include a motor and a motor housing. The motor housing can include first and second holders detachably coupled to each other to define a cavity there between. The first and second holders each have an inwardly extending ledge that supports an end of the motor in the cavity. One of the first and second holders has a groove and the other of said first and second holders has a mating convex. The groove and convex engage to couple the first and second holders together. The first and second holders each have an outwardly facing ledge with holes therein. The holes are configured to receive at least one line member to secure the wheel hub motor to another object to be driven by the motor.

FIG. 1 illustrates an isometric view of a first embodiment of a wheel hub motor 100. The wheel hub motor 100 can include a motor housing 10 and a motor 30. The motor housing 10 can be a detachable structure. The motor 30 can be received in the motor housing 10. Since to the motor housing 10 is detachable, the motor 30 can be replaced by another motor of different performance. The wheel hub motor 100 can be used in a vehicle using electric power. In the illustrated embodiment, the wheel hub motor 100 is used in an electric bicycle.

The motor housing 10 can include a first holder 11, a second holder 13, and a protective ring 15. The first holder 11 and the second holder 13 can be detachably coupled to each other to define a cavity therebetween. The motor 30 can be received between the first holder 11 and the second holder 13. The protective ring 15 can be detachably coupled to the second holder 13, and configured to protect the motor 30. The second holder 13 can be sandwiched between the first holder 11 and the protective ring 15. In the illustrated embodiment, the first holder 11, the second holder 13, and the protective ring 15 can be substantially ring-shaped.

Figure 2:
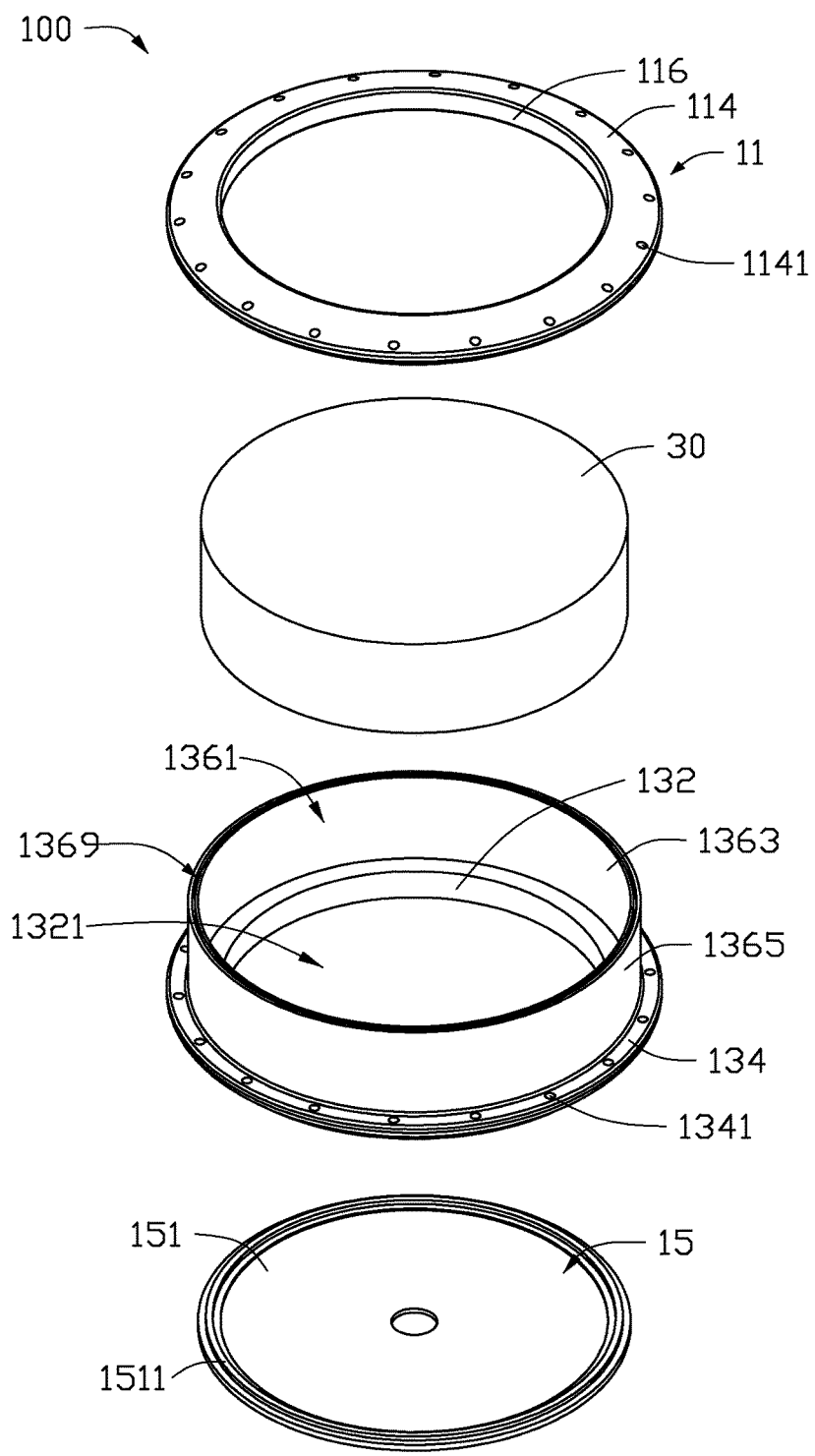
FIG. 2 is an exploded, isometric view of the wheel hub motor of FIG. 1.

FIG. 2 illustrates that the first holder 11 can include an inwardly extending ledge 112, an outwardly facing ledge 114, and an annular protrude portion 116. The inwardly extending ledge 112 can be an inner ring of the first holder 11, and the outwardly facing ledge 114 can be an outer ring of the first holder 11. The outwardly facing ledge 114 can be position at an outer periphery of the inwardly extending ledge 112. The inwardly extending ledge 112 can be coaxial with the outwardly facing ledge 114. The annular protrude portion 116 can protrude from a boundary of the inwardly extending ledge 112 and the outwardly facing ledge 114. The annular protrude portion 116 can be substantially perpendicular to the inwardly extending ledge 112 and the outwardly facing ledge 114. In the illustrated embodiment, the inwardly extending ledge 112, the outwardly facing ledge 114, and the annular protrude portion 116 can be integrated into one-piece.

The inwardly extending ledge 112 can define a first through hole 1121. The annular protrude portion 116 can define a first receiving hole 1161. An inner diameter of the annular protrude portion 116 (that is a diameter of the first receiving hole 1161) can be larger than an inner diameter of the inwardly extending ledge 112 (that is a diameter of the first through hole 1121). The inner diameter of the annular protrude portion 116 can be equal to an outer diameter of the motor 30. Thus, the motor 30 can be put into the first holder 11 from the first receiving hole 1161 until touching the annular support member 112. The outwardly facing ledge 114 can define a plurality of coupling holes 1141 arranged around a periphery of the outwardly facing ledge 114. The coupling holes 1141 are configured to pass one or more line members of a wheel, thus the one or more line members can be fixed to the outwardly facing ledge 114. The one or more line members can be one or more steel wires.

A structure of the second holder 13 can be similar to a structure of the first holder 11. The second holder 13 can include an inwardly extending ledge 132, an outwardly facing ledge 134, and an annular protrude portion 136. The inwardly extending ledge 132 can be an inner ring of the second holder 13, and the outwardly facing ledge 134 can be an outer ring of the second holder 13. The outwardly facing ledge 134 can be position at an outer periphery of the inwardly extending ledge 132. The inwardly extending ledge 132 can be coaxial with the outwardly facing ledge 134. The annular protrude portion 136 can protrude from a boundary of the inwardly extending ledge 132 and the outwardly facing ledge 134. The annular protrude portion 136 can be substantially perpendicular to the inwardly extending ledge 132 and the outwardly facing ledge 134. In the illustrated embodiment, the inwardly extending ledge 132, the outwardly facing ledge 134, and the annular protrude portion 136 can be integrated into one-piece.

The inwardly extending ledge 132 can define a second through hole 1321. The annular protrude portion 136 can define a second receiving hole 1361. When the first holder 11 is coupled to the second holder 13, the second receiving hole 1361 and the first receiving hole 1161 can corporately define the cavity between the first holder 11 and the second holder 13. An inner diameter of the annular protrude portion 136 (that is a diameter of the second receiving hole 1361) can be larger than an inner diameter of the inwardly extending ledge 132 (that is a diameter of the second through hole 1321). The inner diameter of the annular protrude portion 136 can be equal to an outer diameter of the motor 30. Thus, the motor 30 can be put into the second holder 13 from the second receiving hole 1361 until touching the annular support member 132. The outwardly facing ledge 134 can define a plurality of coupling holes 1341 arranged around a periphery of the outwardly facing ledge 134. The coupling holes 1341 are configured to pass one or more line members of a wheel passing through, thus the one or more line members can be fixed to the outwardly facing ledge 134. The one or more line members can be one or more steel wires.

Figure 3:
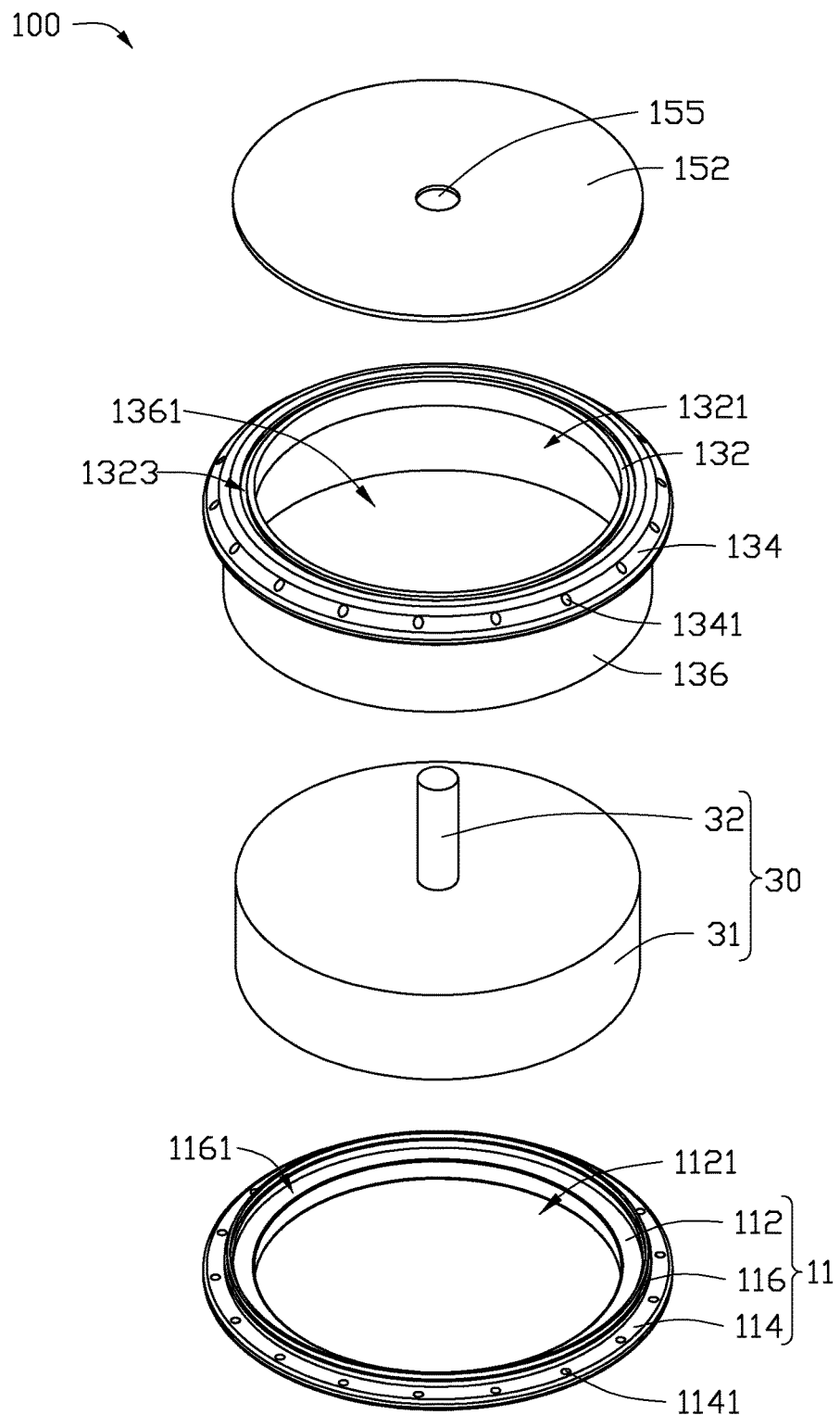
FIG. 3 is similar to FIG. 2, but viewed from another angle.
Figure 4:
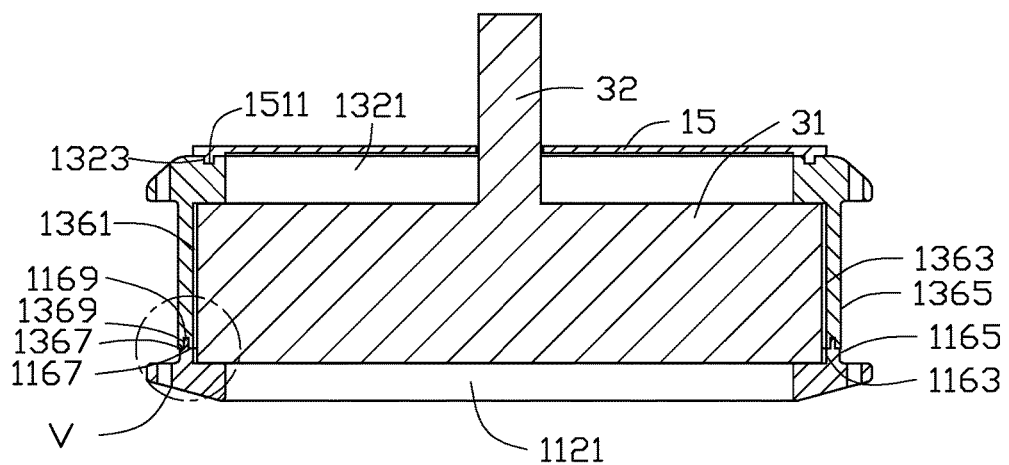
FIG. 4 is a cross-sectional view of the wheel hub motor of FIG. 1, taken along line IV-IV.
Figure 5:
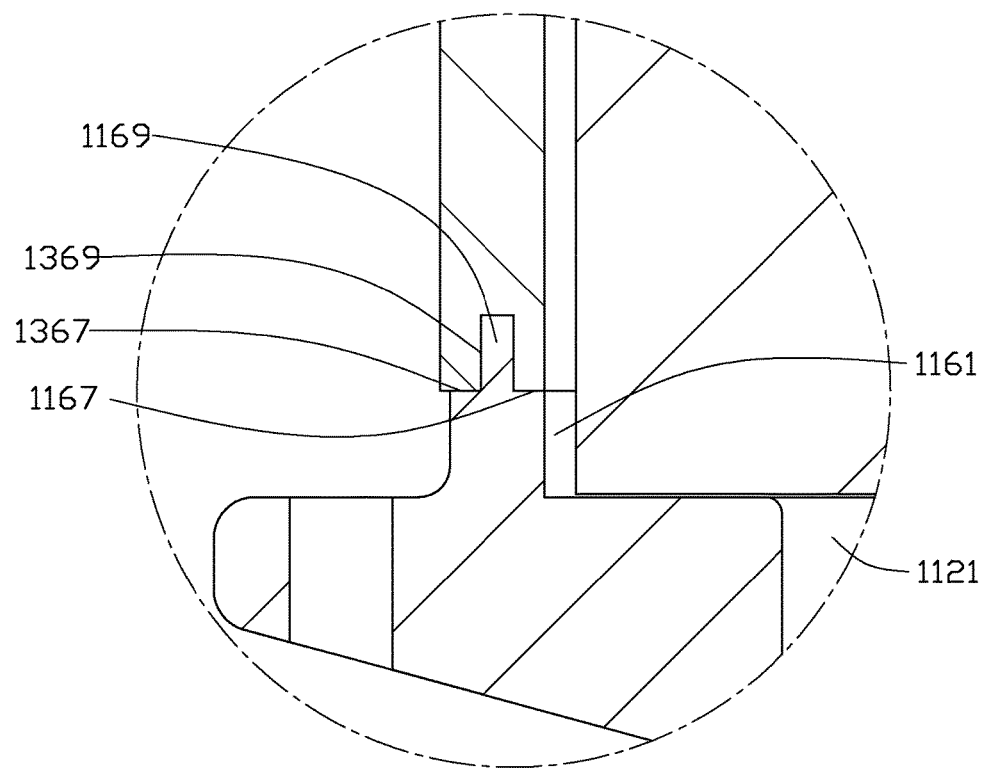
FIG. 5 is an enlarged view of a circle V of FIG. 4.

FIGS. 3 to 5 illustrate that the annular protrude portion 116 of the first holder 11 can include an inner wall 1163, an outer wall 1165, and an end wall 1167. The inner wall 1163 and the outer wall 1165 can be concentric ring walls. The end wall 1167 can be ring-shaped, and substantially perpendicular to the inner wall 1163 and the outer wall 1165. A convex 1169 can protrude from the end wall 1167.

The inwardly extending ledge 132 can define an annular positioning groove 1323 for coupling the protective ring 15. The annular protrude portion 136 of the second holder 13 can include an inner wall 1363, an outer wall 1365, and an end wall 1367. The inner wall 1363 and the outer wall 1365 can be concentric ring walls. The end wall 1367 can be ring-shaped, and substantially perpendicular to the inner wall 1363 and the outer wall 1365. The end wall 1367 can be substantially parallel to the inwardly extending ledge 132 and the outwardly facing ledge 134. The end wall 1367 can define a latching groove 1369 for detachably latched with the convex 1169.

The protective ring 15 can include a first surface 151 and a second surface 152 opposite to the first surface 151. The first surface 151 can be parallel to the second surface 152. An annular positioning protrusion 1511 can protrude from the first surface 151, and configured to be detachably coupled to the positioning groove 1323. Thus, the protective ring 15 can be detachably coupled to the second holder 13. The protective ring 15 can define a third through hole 155. The third through hole 155 can run through the first surface 151 and the second surface 152.

The motor 30 can include a drive body 31 and a rotatable shaft 32 protruding from the drive body 31. The drive body 31 can be received between the first holder 11 and the second holder 13, and the rotatable shaft 32 can extend out from the third through hole 155 of the protective ring 15. The inwardly extending ledge 112 of the first holder 11 and the inwardly extending ledge 132 of the second holder 13 can respectively block opposite ends of the motor 30, to prevent the motor 30 from dropping out of motor housing 10.

When the motor 30 needs to be replaced, the first holder 11 and the second holder 13 can be detached. After another motor is replaced, the first holder 11 and the second holder 13 can be coupled together again. The protective ring 15 can be alternatively detached from the second holder 13 during replacing the motor. When the protective ring 15 is detached during replacing the motor, an user can see whether a size of a replaced motor is suitable from the second through hole 1321.

Figure 6:
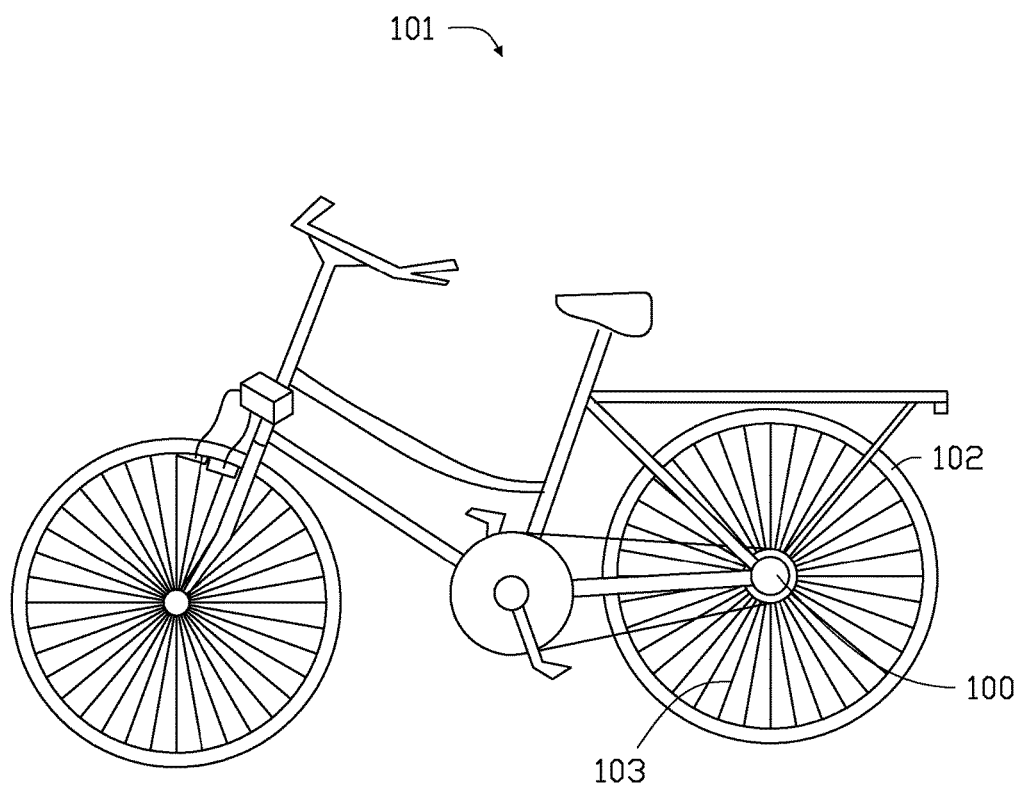
FIG. 6 is a side view of a bicycle having the wheel hub motor of FIG. 1.

FIG. 6 illustrates a bicycle 101 having the wheel hub motor 100. The wheel hub motor 100 can be coupled to a tire 102 of the bicycle 101 via a plurality of steel wires 103. The coupling holes 1341 and the coupling holes 1141 are configured to pass one or more steel wires 103, thus the steel wires 103 can be fixed to the outwardly facing ledge 134 and the outwardly facing ledge 114. Thus, the motor 30 can drive the tire 102 via the steel wires 103.

Figure 7:
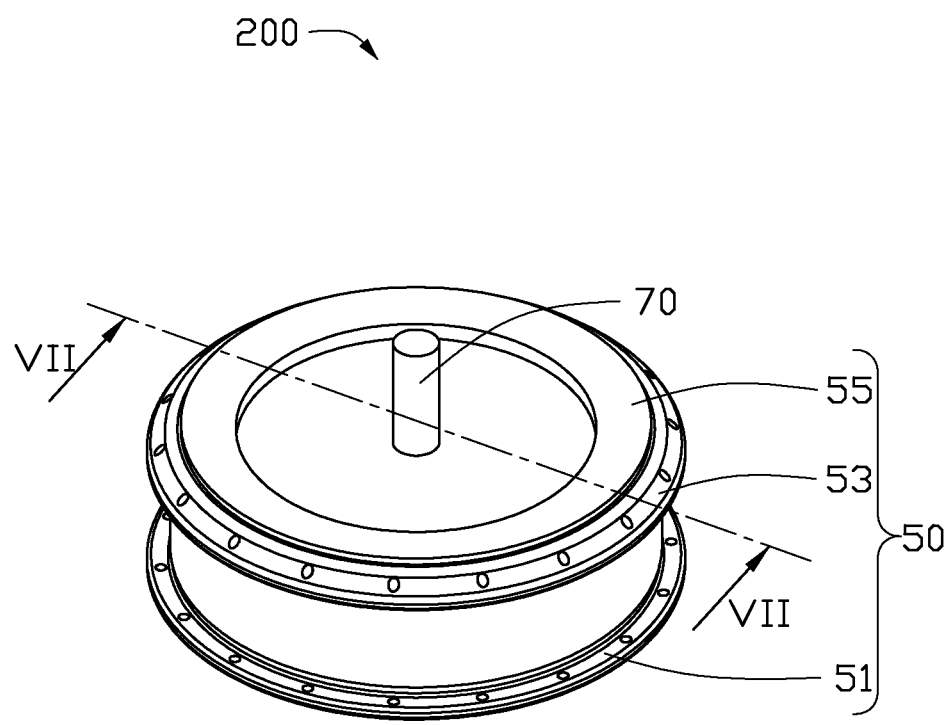
FIG. 7 is an isometric view of a second embodiment of a wheel hub motor.
Figure 8:
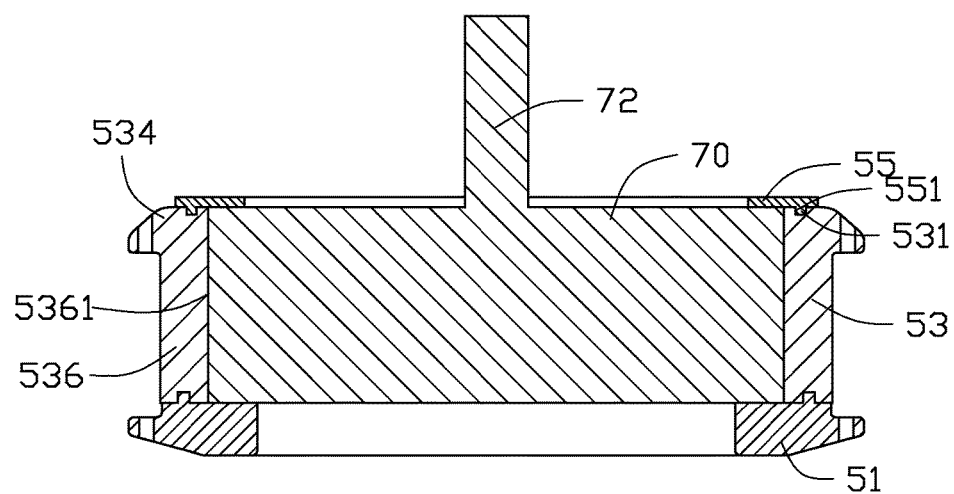
FIG. 8 is a cross-sectional view of the wheel hub motor of FIG. 6, taken along line VII-VII.

FIG. 7 illustrates an isometric view of a second embodiment of a wheel hub motor 200. A structure of the wheel hub motor 200 can be similar to a structure of the wheel hub motor 100 of the first embodiment. The wheel hub motor 200 can include a motor housing 50 and a motor 70. The motor housing 50 can include a first holder 51, a second holder 53, and a protective ring 55. Differences of the wheel hub motor 200 relative to the wheel hub motor 100 of the first embodiment are illustrated as the following. FIG. 8 illustrates that the second holder 53 fails to include an inwardly extending ledge, and an inner diameter of the second holder 53 can be equal to an outer diameter of the motor 70. Thus, the second holder 53 can only include an outwardly facing ledge 534, and an annular protrude portion 536 protruding from the outwardly facing ledge 534. The annular protrude portion 536 can axially define a receiving chamber 5361 running through the second holder 53. A diameter of the receiving chamber 5361 can be equal to the outer diameter of the motor 70.

A motor body of the motor 70 can be wholly received in the receiving chamber 5361. An outer diameter of the protective ring 55 can be larger than the outer diameter of the motor 70. An inner diameter of the protective ring 55 can be smaller than the outer diameter of the motor 70. A positioning groove 531 can be defined at an outer wall of the second holder 53. The positioning groove 531 can be configured to detachably couple a positioning protrusion 551 of the protective ring 55. In the second embodiment, the protective ring 55 can prevent the motor 70 from dropping out of the motor housing 50. In the illustrated embodiment, a diameter of a rotatable shaft 72 of the motor 70 can be smaller than the inner diameter of the protective ring 55. The inner diameter of the protective ring 55 can be larger than double of the diameter of the rotatable shaft 72. The positioning groove 531 can be defined at the outwardly facing ledge 534 of the second holder 53.

The motor 70 of the wheel hub motor 200 can also be replaced easily. In an alternative embodiment, the first holder 51 can be fixedly coupled to the second holder 53. Then the motor 70 can be put into the motor housing 50 from the receiving chamber 5361 when the protective ring 55 being detached away.

The embodiments shown and described above are only examples. Many details are often found in the art such as the other features of a wheel hub motor and a motor housing. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A wheel hub motor, comprising:
    a motor housing, comprising:
        a first holder, comprising
            an inwardly extending ledge;
            an outwardly facing ledge positioned at an outer periphery of the inwardly extending ledge and coaxial with the inwardly extending ledge, and
            an annular protrude portion substantially perpendicularly protruding from a boundary of the inwardly extending ledge and the outwardly facing ledge, wherein the annular protrude portion comprises an inner wall, an outer wall, and an end wall, the inner wall and the outer wall are concentric ring walls, the end wall is substantially perpendicular to the inner wall and the outer wall, a convex protrudes from the end wall;
        a second holder detachably coupled to the convex of the first holder, and
        a protective ring detachably coupled to the second holder,
        wherein the second holder is positioned between the first holder and the protective ring; and
    a motor comprising:
        a motor body received between the first holder and the second holder, and blocked by the inwardly extending ledge, and
        a rotatable shaft protruding from the motor body and extending out from the protective ring.

2. The wheel hub motor of claim 1, wherein the inwardly extending ledge defines a first through hole, the annular protrude portion defines a first receiving hole, a diameter of the first receiving hole is greater than a diameter of the first through hole, the diameter of the first receiving hole is substantially equal to an outer diameter of the motor.

3. The wheel hub motor of claim 1, wherein the outwardly facing ledge defines a plurality of coupling holes arranged around a periphery of the outwardly facing ledge.

4. The wheel hub motor of claim 1, wherein the second holder comprises:
    an inwardly extending ledge configured to block the motor,
    an outwardly facing ledge positioned at an outer periphery of the inwardly extending ledge and coaxial with the inwardly extending ledge, and
    an annular protrude portion substantially perpendicularly protruding from a boundary of the inwardly extending ledge and the outwardly facing ledge, the annular protrude portion defines a latching groove for detachably latching the convex of the first holder.

5. The wheel hub motor of claim 4, wherein the inwardly extending ledge of the second holder defines a positioning groove, a positioning protrusion protrudes from the protective ring, the positioning protrusion is detachably latched to the positioning groove.

6. The wheel hub motor of claim 1, wherein the second holder comprises:
    an outwardly facing ledge, and
    an annular protrude portion protruding from the outwardly facing ledge, the annular protrude portion axially defines a receiving chamber, a diameter of the receiving chamber is substantially equal to an outer diameter of the motor.

7. The wheel hub motor of claim 1, wherein an inner diameter of the second holder is substantially equal to an outer diameter of the motor, an outer diameter of the protective ring is greater than the outer diameter of the motor, an inner diameter of the protective ring is smaller than the outer diameter of the motor.

8. A motor housing, comprising:
    a first holder, comprising:
        an inwardly extending ledge,
        an outwardly facing ledge positioned at an outer periphery of the inwardly extending ledge and coaxial with the inwardly extending ledge, and
        an annular protrude portion substantially perpendicularly protruding from a boundary of the inwardly extending ledge and the outwardly facing ledge, wherein the annular protrude portion comprises an inner wall, an outer wall, and an end wall, the inner wall and the outer wall are concentric ring walls, the end wall is substantially perpendicular to the inner wall and the outer wall, a convex protrudes from the end wall;
    a second holder detachably coupled to the convex of the first holder, and
    a protective ring detachably coupled to the second holder, wherein the second holder is positioned between the first holder and the protective ring.

9. The motor housing of claim 8, wherein the inwardly extending ledge defines a first through hole, the annular protrude portion defines a first receiving hole, a diameter of the first receiving hole is greater than a diameter of the first through hole.

10. The motor housing of claim 8, wherein the second holder comprises:
    an inwardly extending ledge,
    an outwardly facing ledge position at an outer periphery of the inwardly extending ledge and coaxial with the inwardly extending ledge, and
    an annular protrude portion substantially perpendicularly protruding from a boundary of the inwardly extending ledge and the outwardly facing ledge, the annular protrude portion defines a latching groove for detachably latching the convex of the first holder.

11. The motor housing of claim 8, wherein the second holder comprises:
   an outwardly facing ledge, and
   an annular protrude portion protruding from the outwardly facing ledge, the annular protrude portion axially defines a receiving chamber.

12. The motor housing of claim 11, wherein an outer diameter of the protective ring is greater than a diameter of the receiving chamber, an inner diameter of the protective ring is smaller than the diameter of the receiving chamber.

* * * * *